March 10, 1959 S. REINER ET AL 2,877,308

DRIFT CANCELLATION DEVICE FOR DIRECT CURRENT INTEGRATORS

Filed Sept. 3, 1953 2 Sheets-Sheet 1

INVENTOR
STEWART REINER, et al
BY D. B. Snyder
R. I. Tompkins
ATTORNEYS

DRIFT CANCELLATION DEVICE FOR DIRECT CURRENT INTEGRATORS

Filed Sept. 3, 1953 2 Sheets-Sheet 2

INVENTOR
STEWART REINER, et al

BY

ATTORNEYS

United States Patent Office 2,877,308
Patented Mar. 10, 1959

2,877,308

DRIFT CANCELLATION DEVICE FOR DIRECT CURRENT INTEGRATORS

Stewart Reiner, New Rochelle, and David C. Hughes and Martin L. Scheiner, New York, N. Y., assignors, by mesne assignments, to the United States of America as represented by the Secretary of the Navy Application September 3, 1953, Serial No. 378,439

12 Claims. (Cl. 179—171)

Figure 1:
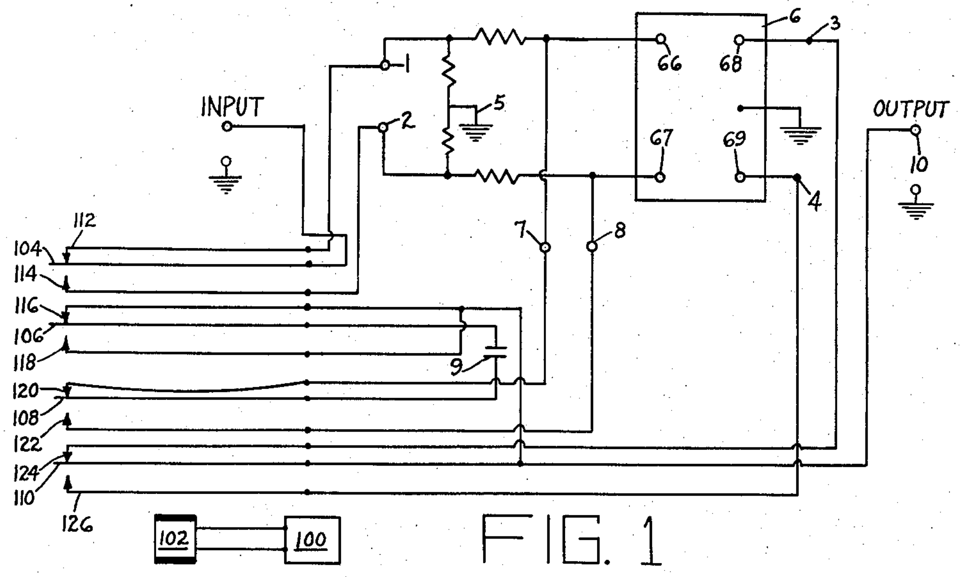

The present invention relates in general to direct current amplifiers and more particularly to the cancellation of errors or drift that are generated by the direct current amplifier.

Today, direct current amplifiers have vast applications in the electronics and electrical field. Direct current or direct coupled amplifiers, as these amplifiers are most often referred to, have their principal application where amplification of very slow variations in voltage, or the amplification of D.-C. voltages are desired. In a direct coupled amplifier, the plate of one tube is connected directly to the grid of the next tube without being connected through any capacitor or transformer.

Direct coupled amplifiers, however, are notoriously susceptible to zero drift. The major causes of the instability of D.-C. amplifiers are variations in the plate, the bias and the screen voltage supplies. Variations in the filament supply voltage will also contribute to drift of a D.-C. amplifier. The supply voltage variations and fluctuations may be reduced to a minimum by the utilization of a well regulated power supply; however, this is extremely difficult to accomplish because well regulated power supplies require stable D.-C. amplifiers and non-drifting voltage references. Also contributing largely to drift within a D.-C. amplifier are cathode flicker or spontaneous emission changes that are characteristic of most cathode materials. Movements of the elements within the tube, as a result of vibrations, also contribute to fluctuations or zero drift, as will variations in grid gas currents because their resultant voltage drop affects grid bias.

Because of the undesirable zero drift characteristics that are inherent with D.-C. amplifiers, various ways and means to reduce said zero error have become notorious.

Modulator type D.-C. amplifiers have been frequently utilized to decrease the zero drift of D.-C. amplifiers. In a modulator type direct coupled amplifier, the D.-C. information is converted to an amplitude modulated A.-C. signal. The converted signals are then amplified in capacitively coupled amplifiers and then converted back into the original low frequency or D.-C. information. However, modulator type D.-C. amplifiers have certain distinct disadvantages. Any drift that is present in the modulator element will cause error in the modulator amplifier. This type of amplifier is also limited to the amplification of low frequencies and, therefore, not practical where the amplification of higher frequency components is required.

The usual method of modulation is accomplished by the utilization of vibrators that chop the low frequency voltages at a high rate. Other methods that are used to decrease the zero drift of D.-C. amplifiers are as follows: (1) Vacuum tube modulators. With this method high impedance inputs are obtained although the modulators are extremely unstable. (2) A variable capacitance modulator presents a high input impedance but has poor conversion efficiency and requires extreme caution and special techniques during manufacture. (3) Crystal diodes are used for nonthermionic modulators but they exhibit poor thermal D.-C. stability and do not lend themselves to very high impedance operation. (4) Electromechanical D.-C. amplifiers have been devised that utilize the photoelectric detection of movement of a light beam due to deflection of a D'Arsonval galvanometer movement. The electromechanical methods require a relatively large amount of negative feedback and are extremely sensitive to vibrations. In general, both the modulator type D.-C. amplifier and the electromechanical type of D.-C. amplifiers are slow in their response.

With the present invention, the error or offset voltage is separated from the signal voltage. The offset voltage is then reversed periodically. The integral of the error voltage would then change its direction after each reversal. Therefore, at any time, the total integral of the offset or zero drift voltage would have a finite, and, with proper precautions, a small value.

The present invention comprises an amplifier that is designed so that its input and output can be reversed synchronously. Two double pole, double throw switches are connected to the amplifier one at the input and one at the output, so that no reversal of the polarity of the input voltage with respect to the output voltage is experienced, regardless of the position of the synchronized switches. The switches in no way contribute to the amplification of the signal, but merely invert the amplifier. If there is an initial offset in the amplifier when the switches perform the inversion, then the offset that appears within the amplifier will have a polarity sense opposite to its previous sense, while the signal continues to be integrated with no polarity change. Therefore, if the offset is assumed to be E volts, the integrator will integrate $e+E$ during one period and $e-E$ during the next period; with the result that after every two succeeding periods the integral of the offset will be equal to zero.

It is, therefore, an object of the present invention to provide a D.-C. amplifier having an integrated output that will contain very little error.

It is another object of the present invention to generate a signal having a continuous polarity plus an offset voltage having a positive and then a negative polarity.

It is a further object of the present invention to provide a system that has rapid response.

It is an additional object of the present invention to provide a system that will respond accurately to very low frequency changes and to higher frequency changes.

It is another object of the present invention to provide a D.-C. amplifier that will not be adversely affected by vibrations.

It is another object of the present invention to separate the error voltage from the signal voltage and to periodically reverse the offset voltage.

It is an additional object of the present invention to provide a system that will not require well regulated power supplies.

Figures 2, 4, 5:
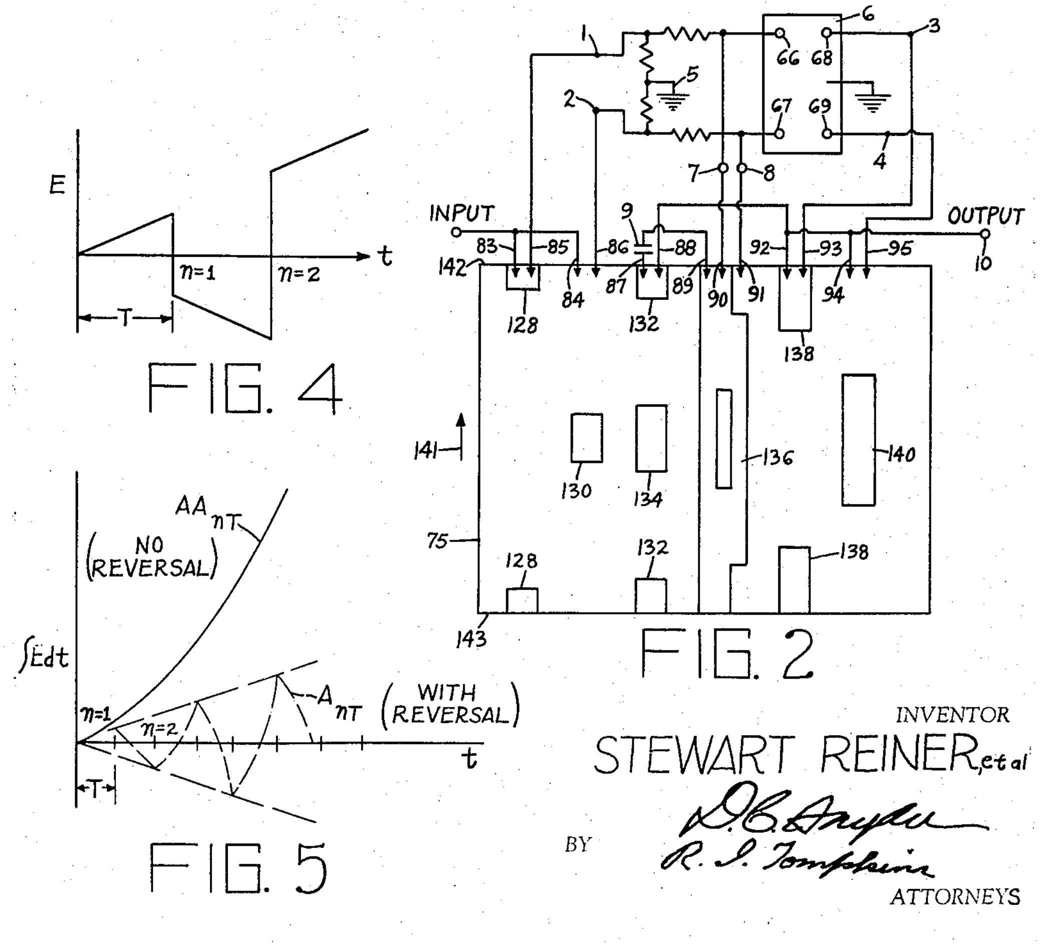
Figure 3:
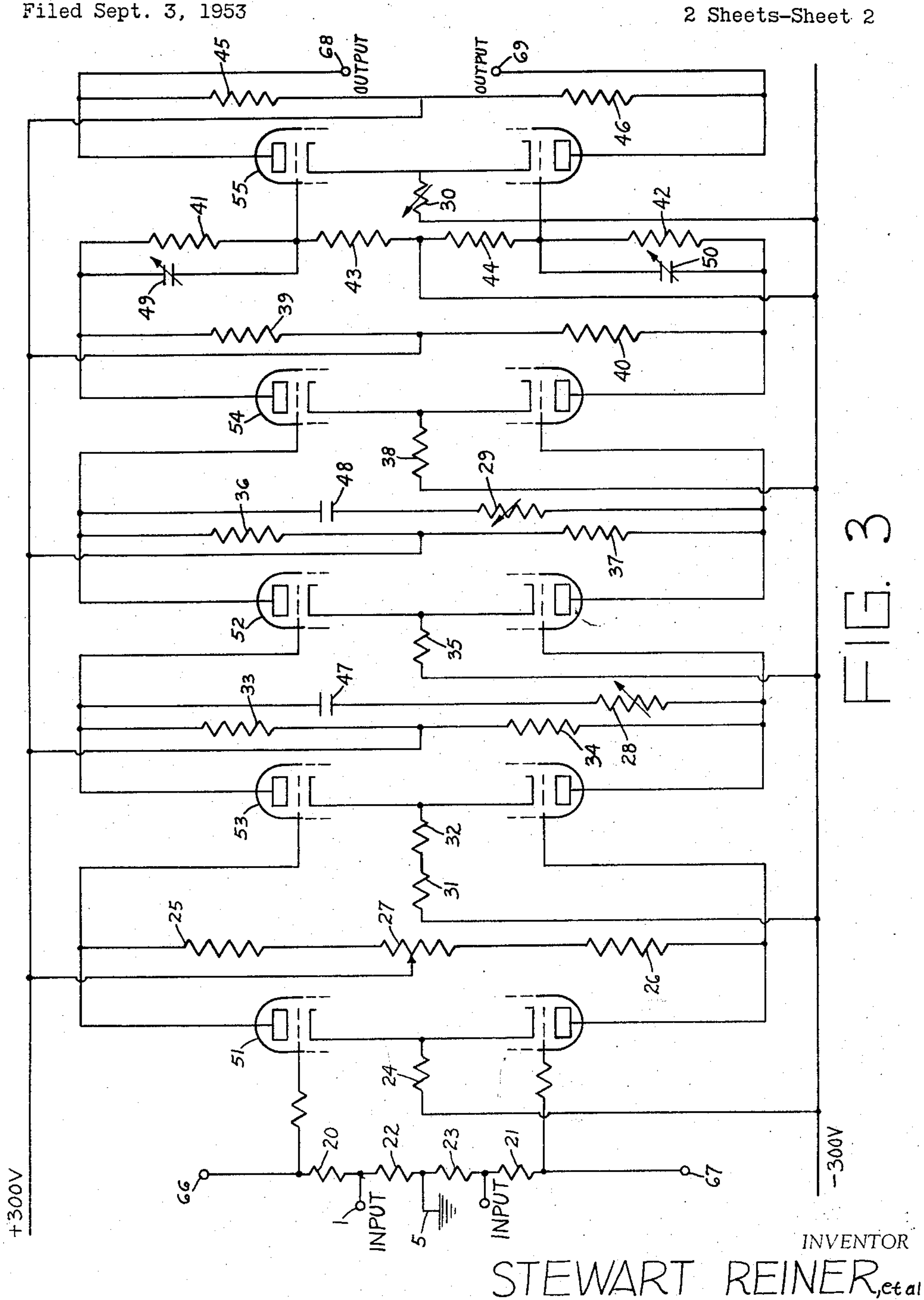

Other objects and many of the attendant advantages of this invention will be readily appreciated as the same becomes better understood by reference to the following detailed description when considered in connection with the accompanying drawings wherein:

Fig. 1 is a preferred form of the present invention showing a block diagram of the amplifier and a relay connected to said amplifier to reverse the error voltage of the amplifier, Fig. 2 is a modification of the present invention utilizing a drum as switching means, Fig. 3 is a schematic of a D.-C. amplifier having a push-pull amplifier, Fig. 4 is a graph of the offset voltage that is seen by the condenser, and Fig. 5 is a graphic representation of the integral of the offset voltage with respect to time when there is no switching, and when there is switching.

The fundamental components of the present invention are illustrated in Fig. 1. This figure shows a push pull amplifier 6 having two input terminals 1 and 2 and two output terminals 3 and 4. This amplifier 6 also incorporates a common ground 5. The amplifier 6 has a gain of $-G$. Therefore, a voltage $e$ that is applied at input terminal 1, with respect to ground, will result in a voltage of $-Ge$ volts with respect to ground at output terminal 3 and an equal voltage having an opposite polarity of $+Ge$ at output terminal 4. An equal voltage of $e$, with respect to ground, that is now applied to the input terminal 2 of amplifier 6 will result in a voltage of $-Ge$ at output terminal 4, and a voltage of $+Ge$ volts at output terminal 3. Therefore, from input terminal 1 through the amplifier 6 to output terminal 3, and from input terminal 2 through the amplifier 6 to output terminal 4, a voltage gain of $-G$ is produced.

From the viewpoint of accurate maintenance of a zero reference in a long term integrator, the offsets that remain one-sided for long periods of time are of interest because these error signals, when integrated, result in very large output drifts and destroy the reference value of the integrator. By separating the offset voltage from the signal voltage, and then reversing the offset voltage periodically, the integral of the error voltage changes its direction after every reversal. Therefore, at any time, the total integral of the offset would have a finite, and, with proper precautions, an extremely small value.

In an actual system, the offset will probably change slowly with time and may even, over a long period of time, reverse its polarity spontaneously. A more serious type of offset is one that continuously grows with time. The last mentioned type of offset can result from a slowly deteriorating circuit element or a long term temperature change. However, drift of extreme character will not be encountered in a well designed system. Therefore, for the purposes of illustration, the integral of a linearly increasing offset will be illustrated to show how switching reduces the offset effect. It shall be assumed that the offset shall be represented by $$E=ct$$

where $c$ is assumed to be a constant in volts per second and $t$ is the time interval between reversals. Referring to Fig. 4, after reversal, the offset will appear to the condenser in the form shown. The equation of the voltage curve shown in Fig. 4 is $$E=(-1)^{n+1}ct$$

where $(n-1)t \leqq t \leqq nT$ and $n$ is any positive integer.

The time integral $A_{nT}$ of this function, between 0 and $n$T, evaluated on a discontinuous basis, is found to be $$A_{nT}=(-1)^{n+1}\frac{cnT^2}{2}$$

This integral represents the contribution of a linearly increasing offset to the output of the integrator when the amplifier reversal is utilized.

When there is no reversal, the equation of the input is $$E=ct$$

and its time integral is $$AA_{nT}=\int_0^{nT} E dt=\frac{cT^2}{2}n^2$$

From this it is obvious that the reversal reduces the error due to integration of the offset by the factor $$\frac{A_{nT}}{AA_{nT}}=\frac{1}{n}=\frac{T}{t}$$

The results illustrate the important advantage of reversals in long time integration operations.

A comparison between offset integrals $A_{nT}$ and $AA_{nT}$ is illustrated in Fig. 5 for offsets of the type that is illustrated in Fig. 4.

Returning to Fig. 1, any offset in the amplifier, whether due to unbalance, tube element variation, or the like, will appear as an error voltage at the amplifier output terminal 3 and as an equal voltage having an opposite polarity at the other amplifier output terminal 4. This property of symmetry of offset at the output terminals 3 and 4 of the amplifier makes the balanced amplifier arrangement particularly suitable to this application. Also, the symmetrical structure of the amplifier 6 makes it, to a great extent, self-compensating to many offsets to which single ended amplifiers are subject. When an input of $e$ volts is applied through the input switch, and the D.-C. amplifier has an equivalent offset of E volts, then voltages of $-G(e+E)$ and $-G(e-E)$ will appear at the output terminals 3 and 4 of the amplifier, respectively, depending upon the relative polarity of E.

Referring to Fig. 3, the amplifier has an odd number of stages and provides a gain of 285,000. The 12AY7 input tube 51 was selected for balance but not for low noise or low grid current characteristics. Any convenient 300 volt power supply can be used for the positive and negative voltage supplies. In the present invention the filaments were wired in series. The various components of the push-pull amplifier are identified in the following table.

| Component | Name and value of component |
|---|---|
| 20, 21, 25 and 26 | 1M ohm Resistor. |
| 22 and 23 | 1.1K ohm Resistor. |
| 24 | 670K ohm Resistor. |
| 31 | 10K ohm Resistor. |
| 32 | 377K ohm Resistor. |
| 33, 34, 43, 44, 45 and 46 | 300K ohm Resistor. |
| 36 and 37 | 200K ohm Resistor. |
| 39 and 40 | 50K ohm Resistor. |
| 41 and 42 | 800K ohm Resistor. |
| 27 | 20K ohm Potentiometer. |
| 28 and 29 | 50K ohm Potentiometer. |
| 30 | 0.1M ohm Potentiometer. |
| 47 and 48 | .006 μfd. Condensers. |
| 49 and 50 | 3-30 μμfd. |
| 51 | 12 AY7. |
| 52, 53, and 54 | 12 AU7. |
| 55 | 12 AT7. |
| 49 and 50 | 3-30 μμfd. variable condenser. |

The design and construction of the balanced amplifier is not critical and, as such, may be altered in any manner that is convenient. The amplifier was referred to, in detail, for illustrative purposes only, and, therefore, may be replaced in its entirety by any convenient balanced amplifier.

Referring to Fig. 1, condenser 9 is of the proper size and is utilized as a feedback means. Switching is accomplished by means of a four pole two throw relay, the period of which is controlled by a multi-vibrator 100. The design of the multivibrator 100 is not shown as the design and construction of said item is well known to those experienced in the art. The four pole two throw relay 102 performs the necessary switching operations in the proper sequence to obtain the accurate integration of the signal with an absolute minimum of error. A switching rate of once each thirty seconds was found to be acceptable. However, this rate is not critical and may vary over an extremely wide range.

The determination of the exact sequence of the operations is of paramount importance in maintaining the integral without spurious changes of the integrating condenser voltage. The final sequence that is adhered to for a typical cycle is as follows:

(1) The signal input is removed from the grid terminal 66. At this instant integration stops.

(2) The feedback loop containing feedback condenser 9 is opened. This prevents the feedback condenser from discharging during the time that the amplifier is inoperative.

(3) The input grid terminals 66 and 67 are shorted together. This step is necessary to reduce the possibility of oscillations.

(4) The output is removed from plate terminal 68 and switched to plate terminal 69.

(5) The input grid terminals 66 and 67 are unshorted leaving grid terminal 67 connected to the feedback condenser. At this point the amplifier has now been reversed.

(6) The feedback circuit is closed. Now the integrator is ready to operate.

(7) The input signal is applied to grid terminal 67 and integration resumes.

Referring to the form of the present invention that is illustrated in Fig. 1, terminals 1 and 2 are connected to the grid terminals 66 and 67 respectively, of the balanced amplifier 6 through a resistive network of the proper resistance. Terminals 3 and 4 are connected to the plate terminals 68 and 69, respectively. Terminals 7 and 8 are connected directly to the grid terminals 66 and 67.

Relay 102 is a four pole two throw relay wherein pole 104 makes an electrical connection with contacts 112 and 114; pole 106 makes an electrical connection with contacts 116 and 118; pole 108 makes an electrical connection with contacts 120 and 122; and pole 110 makes an electrical connection with contacts 124 and 126.

Pole 104 is connected to the input signal terminal that is connected to the high potential side of the signal generating equipment. The ground side of said signal generating equipment is coupled to a ground terminal 5. Contact 112 is connected to input terminal 1 of the amplifier and contact 114 is connected to the input terminal 2 of the amplifier 6. Pole 106 is connected to pole 108 through feedback condenser 9. Contacts 116 and 118 are connected together and said contacts are in turn connected to pole 110. Contact 120 is connected to terminal 7 and contact 122 is connected to terminal 8. Contact 124 is connected to terminal 3 of amplifier 6 and contact 126 is connected to output terminal 4 of amplifier 6. The output of the amplifier is received across the terminal 10 and the ground 5, said terminal 10 being connected directly to pole 110.

The relay 102 operates in the following manner. The coil of relay 102 receives a pulse of voltage having a predetermined time duration. The time duration and frequency of the pulse is controlled by a multi-vibrator; or an on-off switch that is controlled by a motor and cam arrangement. The instant the coil of relay 102 receives a voltage pulse, the relay contacts break and make contact in the following manner:

Pole 104 breaks connection with contact 112 and continues to move downward towards contact 114. At this instant the signal has been removed from terminal 1 and integration stops. Immediately after the pole 104 breaks connection with contact 112, pole 106 breaks connection with contact 116 and continues to move downward towards contact 118. This step opens the feedback loop containing the feedback condenser 9, thus preventing the condenser from discharging during the time interval that the amplifier is inoperative. Immediately after the pole 106 breaks connection with contact 116, the pole 108, while still maintaining contact with contact 120, moves down and makes connection with contact 122. At this instant the grid terminals 66 and 67 are shorted together thus reducing the possibility of oscillations.

Immediately after the grids of the amplifiers are shorted together, the pole 110 breaks connection with contact 124 and proceeds downward to make a connection with the contact 126. This last mentioned step changes the connection of the output terminal 10 from terminal 3 to terminal 4. Immediately after the output terminal 10 is changed from plate terminal 68 to plate terminal 69, pole 108 moves down to break its electrical connection with contact 120, thus unshorting the input grid terminal 67 from grid terminal 66 and leaving grid terminal 67 connected to the feedback condenser 9. At this point the amplifier has been reversed. Now the pole 106, in its downward movement, makes an electrical connection with contact 118, thus closing the feedback circuit. At this instant the integrator is ready for operation. Immediately after the last mentioned step, pole 104 makes contact with contact 114 thus connecting the signal to the grid terminal 67 and integration resumes.

Integration continues until the voltage is removed from the terminals of the coil of relay 102. When said voltage is removed, the same sequence of events occurs, however, the polls 104, 106, 108 and 110 of the relay move in an upward direction thus breaking contact with the lower cooperating contacts and making connection with the upper cooperating contacts. Therefore the sequence of operation of the relay 102, when the voltage is removed from the coil of the relay, is as follows:

Pole 104 disconnects from contact 114; then pole 106 disconnects from contact 118; then pole 108 makes contact with contact 120 while still being connected to contact 122; then pole 110 disconnects from contact 126 and makes contact with contact 124; then pole 108 disconnects from contact 122 but continues to retain contact with contact 120; then pole 106 makes connection with contact 116; and then contact 104 makes connection with contact 112 at which time integration resumes.

With this method the time that is required for switching is extremely small and, therefore, the period of time inoperativeness of the integrator is negligible as compared to that period of time during which integration takes place. Thus the integral of the signal is continuous. It will be obvious to those familiar with the relay art that the sequence of connections described occurs in a time increment of a split second, and that the sequence is determined simply by the well known practice of spacing the contacts properly and adjusting the spring tension on the contact arms. For instance, the arm of contact 120 must be highly resilient and may be bowed slightly in order that it may follow pole 108 downwardly to touch contact 122 and later allow a break at 120 when pole 108 moves down further against the tension of the arm for contact 122.

To those that are experienced in the art it will become obvious that the present invention can be altered and, in its new form, function in the same manner as described above. Fig. 2 is a modified form of the present invention.

Referring to Fig. 2, the input terminals 1 and 2 of the balanced D.-C. amplifier 6 are connected to brushes 85 and 86, respectively. The output terminals 3 and 4 are connected to brushes 93 and 95 respectively. The grid terminals 7 and 8 of the first stages, are connected to brushes 90 and 91 respectively and the feedback condenser 9 is connected between brushes 87 and 89. The brushes 83 to 95 inclusive contact the revolving drum 75. The drum 75 is composed of a non-conducting material, such as Bakelite, containing conducting segments 128, 130, 132, 134, 136, 138 and 140 essentially as shown. The input is connected to brushes 83 and 84. Brushes 88, 92 and 94 are connected together and then connect to the output terminal 10. Brushes 83 and 85 contact conducting segment 128. Brushes 84 and 86 contact conducting segment 130. Brushes 87 and 88 contact conducting segments 132 and 134. Brushes 89, 90 and 91 contact conducting segment 136. Brushes 91 and 93 contact segment 138 and brushes 94 and 95 contact conducting segment 140.

The conducting segments of the drum 75 and the said mentioned brushes perform in the same manner as the relay, that was described above, in that circuits are periodically and sequentially opened and closed. The pattern of the conducting segments on the surface of the drum has been opened and rolled out to show the complete pattern. In actual operation, edge 142 and edge 143 are rolled around a drum and coincide to form a continuous surface containing the pattern as illustrated in Fig. 2.

As the drum 75 rotates in the direction that is indicated by arrow 141, the following sequence occurs. First, the connection between brushes 83 and 84 becomes discontinuous as the edge of segment 128 passes beyond the brushes. This removes the signal from the terminal 1 of the amplifier 6 and integration stops. Next the connection between brushes 87 and 88 becomes discontinuous thus opening the feedback loop containing the feedback condenser 9. Then brush 91 makes an electrical connection with brushes 89 and 90 thus shorting the grid terminals 66 and 67 of the amplifier 6. Next, the connection between brushes 92 and 93 becomes discontinuous and, almost immediately after, the connection between brushes 94 and 95 becomes continuous by the action of the conducting segment 140. This last mentioned step changes the connection of the output terminal 10 from terminal 3 to terminal 4. Next, the brush 90 is disconnected from brushes 89 and 91 thus unshorting the input grid terminal 67 from grid terminal 66 and leaving the input grid terminal 67 connected to the feedback condenser. Next, the connection between brushes 87 and 88 becomes continuous thus closing the feedback circuit. Then the connection between brushes 84 and 86 becomes continuous, thus connecting the signal to the grid terminal 67 and integration resumes.

Integration continues until the conducting segment 130 passes beyond the brushes 84 and 86 at which time integration stops and the offset of the balanced D.-C. amplifier is reversed.

In this modification, the location of the brushes and the location of the leading and trailing edges of each segment is critical.

Another modification is to place the pattern of conducting segments, that is shown in Fig. 2, upon the flat face of a disk or wheel that is composed of any non-conducting material such as glass or Bakelite. This modification would then utilize a coded wheel rather than a coded drum.

As mentioned previously, any desired balanced D.-C. amplifier may be utilized. The switching may be accomplished by means of relays, cams, make-break contacts or any mechanical or electronic switching means. The frequency of cycling can be controlled by a motor, multivibrator, or any convenient mechanical, electronic or electro-mechanical means.

Obviously many modifications and variations of the present invention are possible in the light of the above teachings. It is therefore to be understood that within the scope of the appended claims the invention may be practiced otherwise than as specifically described.

What is claimed is:

1. An electronic integrator having an output in which the drift component is cyclically balanced out to a substantial extent comprising: a set of terminals for receiving an input signal; a set of terminals for receiving an output signal; an amplifier having input and output circuits connected respectively in circuit with said input and output terminal sets; a feed back section connected between said output and input circuits providing sufficient negative feedback through said amplifier to convert it into an integrating amplifier; and switch means periodically and substantially simultaneously inverting the connections between said input terminal set and said input circuit, and the connections between said output terminal set and said output circuit, so that the polarity of the error component of the output is reversed upon each inversion of the input and output connections while the polarity of the informational component remains undisturbed.

2. A device as set forth in claim 1, wherein said amplifier is a high gain amplifier.

3. A device as set forth in claim 1, wherein said amplifier is a high gain D. C. amplifier.

4. A device as set forth in claim 1, wherein said feedback section network comprises a capacitor and resistor in series.

5. A device as set forth in claim 1, wherein said switch means comprises electro-mechanical relay means.

6. A device as set forth in claim 1, wherein said switch means comprises a rotatable drum bearing thereon a plurality of conductive elements.

7. A device as set forth in claim 1, wherein said switch means comprises a rotatable plate bearing thereon a plurality of conductive elements.

8. A device as set forth in claim 1, wherein said amplifier comprises a balanced amplifier having two input circuits and wherein said switch means includes means switching said feedback section from one input circuit of said balanced amplifier to the other input circuit, so that the negative polarity characteristic of the feedback signal remains unchanged despite the inversions of the connections between the input terminal set and the input circuit.

9. An electronic integrator having an output in which the drift component is substantially balanced out comprising: a set of terminals for receiving an input signal; a set of terminals for receiving an output signal; a balanced amplifier having a double-sided input and a double-sided output circuit connected respectively in circuit with said input and output terminal sets, each side of said double-sided input circuit including a series grid resistor; a capacitor connected between an output terminal and one side of said double-sided input circuit so as to provide negative feedback; a multi-pole, double-throw relay having a first set of contacts connected to invert the connections between said input terminal set and said input circuit upon operation of said relay, a second set of contacts connected to invert the connections between said output terminal set and said output circuit upon operation of said relay, a third set of contacts momentarily breaking the connection between one side of said capacitor and said output terminal, and a fourth set of contacts connecting the other side of said capacitor in circuit with the grid resistor associated with that side of the input circuit to which input signal is then being applied, said capacitor and each resistor forming an integrative feedback network for said amplifier; and means for periodically energizing said relay in such a manner that the durations of the energized and non-energized periods are equal.

10. A device as set forth in claim 9, wherein the poles of said relay operate in rapid sequence when said relay is energized and deenergized, the poles associated with the first, third, fourth and second sets of contacts operating in that order.

11. An electronic integrator having an output in which the drift component is substantially balanced out comprising: a set of terminals for receiving an input signal; a set of terminals for receiving an output signal; a balanced amplifier having a double-sided input and a double-sided output circuit connected respectively in circuit with said input and output terminal sets, each side of said input circuit including a series grid resistor; a capacitor connected between an output terminal and one side of said double-sided input circuit so as to provide negative feedback; and a rotatable drum switch having a plurality of conductive segments and brush members arranged to invert the connections between said input terminal set and said input circuit, momentarily break the connection between one side of said capacitor and said output terminal, connect the other side of said capacitor in circuit with the grid resistor associated with that side of the double-sided input circuit to which input signal is then being applied and invert the connections between said output terminal set and said output circuit, the physical size and disposition of said conductive segments and brush members being such that, upon rotation of said drum, said switching actions occur substantially simultaneously and such that the periods between subsequent switching actions is approximately equal.

12. A device as set forth in claim 11, wherein each described group of said switching actions occurs in rapid sequence in the order described in claim 11.

References Cited in the file of this patent

UNITED STATES PATENTS

| | | |
|---|---|---|
| 2,538,488 | Volkers | Jan. 16, 1951 |
| 2,607,528 | McWhirter et al. | Aug. 19, 1952 |
| 2,618,751 | Fearnside et al. | Nov. 18, 1952 |
| 2,624,847 | Jesse et al. | Jan. 6, 1953 |
| 2,628,268 | Kerns | Feb. 10, 1953 |
| 2,754,374 | Enright | July 10, 1956 |
| 2,757,283 | Ingerson et al. | July 31, 1956 |